(No Model.)

L. J. ODELL.
CHECK ROWER ATTACHMENT FOR CORN PLANTERS.

No. 326,449. Patented Sept. 15, 1885.

WITNESSES
Percy C. Bowen

INVENTOR
L. J. Odell.
By C. A. Brown
his Attorneys

UNITED STATES PATENT OFFICE.

LEVI J. ODELL, OF FAIRBURY, ILLINOIS.

CHECK-ROWER ATTACHMENT FOR CORN-PLANTERS.

SPECIFICATION forming part of Letters Patent No. 326,449, dated September 15, 1885.

Application filed June 25, 1885. (No model.)

*To all whom it may concern:*

Be it known that I, LEVI J. ODELL, a citizen of the United States, residing at Fairbury, in the county of Livingston and State of Illinois, have invented a new and useful Improvement in Check-Rower Attachments for Corn-Planters, of which the following is a specification, reference being had to the accompanying drawings.

My invention relates to an improvement in check-rower attachments for corn-planters, being particularly adapted for use in connection with the corn-planter for which Letters Patent of the United States were granted to me June 16, 1885, No. 319,994; and it consists in the peculiar construction and combination of devices that will be more fully set forth hereinafter, and particularly pointed out in the claims.

Figure 1:
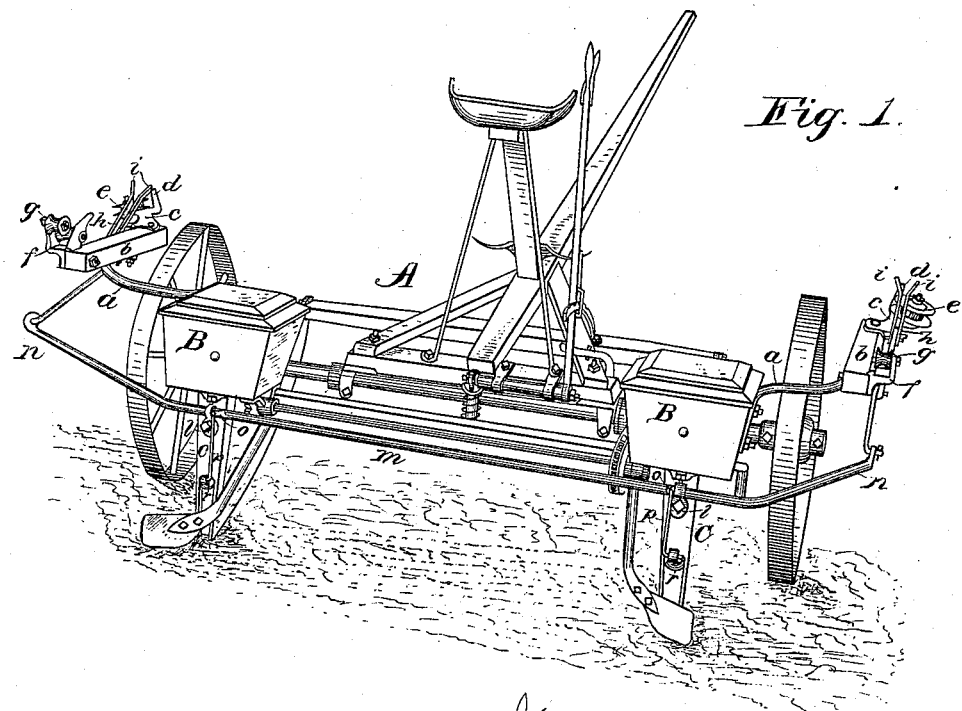
Figure 2:
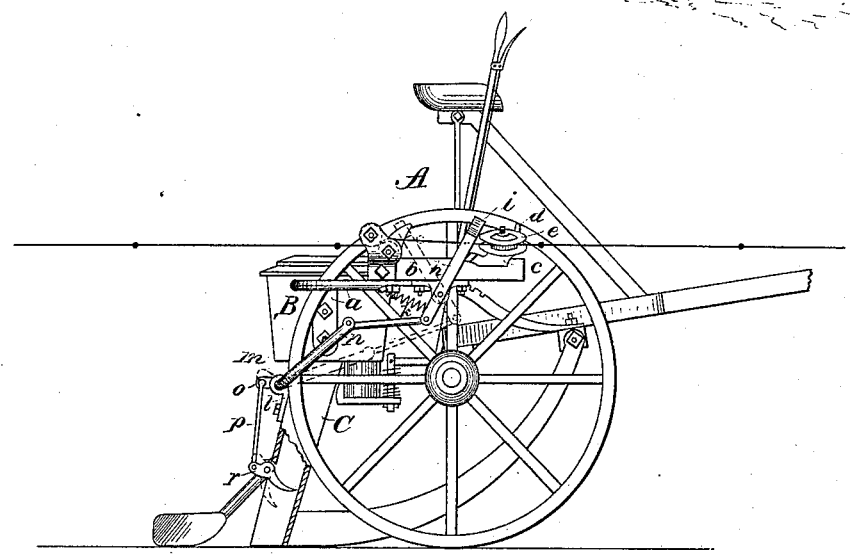

In the accompanying drawings, Figure 1 is a perspective view of my invention. Fig. 2 is a side elevation of the same, one of the seed-tubes of the corn-planter being partly broken away, so as to disclose the interior construction.

A represents one of my improved corn-planters, having the hoppers B, the seed-tubes C, and mechanism for feeding seeds from the hoppers into the seed-tubes; but as such mechanism may be of any preferred construction and forms no part of this invention, it is not necessary to fully describe it here. To the outer sides of the hoppers are bolted bracket-arms $a$, which extend laterally out beyond and in rear of the supporting-wheels, and to the outer ends of these arms are bolted bracket-heads $b$, which extend in the direction of the line of draft. To the front end of each of these heads is bolted a bracket, $c$, having a substantially vertical guard-finger, $d$, and to these brackets are journaled grooved pulleys $e$, which are supported in nearly a horizontal position. To the rear end of each of the heads $b$ are also secured brackets $f$, in which are journaled horizontal grooved wheels or rollers $g$. Levers $h$ are fulcrumed to the outer sides of the heads $b$ near the centers thereof. The upper ends of these levers are bifurcated to leave arms or fingers $i$, that diverge at their upper ends, and the lower ends of said levers extend below the heads $b$ for a suitable distance. Coiled retractile springs $k$ are secured on the under sides of the heads $b$, near the rear ends thereof, and the free ends of these springs are connected to the lower portions of the levers $h$, so as to keep said levers normally in the position shown in solid lines in Fig. 2.

In blocks $l$, which are bolted to or form with the rear sides of the seed-spouts, is journaled a rock-shaft, $m$, which extends transversely across the rear side of the corn-planter and has its outer ends bent upwardly, as at $n$, so as to form arms therefor. Short arms $o$ project rearwardly from the rock-shaft in line with the centers of the seed-tubes, and are connected by rods $p$ with seed-valves $r$, that are fulcrumed in the seed-tubes and have their short ends projecting rearwardly therefrom. These valves, when in the initial position shown in solid lines in Fig. 2, close the seed-tubes and collect the seeds that dropped into the seed-tubes by the seeding mechanism from the hoppers. A knotted cord or wire, such as is commonly used for check-row corn-planters of this class, is stretched across the field and passes on the sheaves or grooved wheels and between the fingers of the lever on one side of the corn-planter, and as the planter is drawn along the knots in the cord or wire successively catch in front of the fingers of the lever and move the lever to the position shown in dotted lines in Fig. 2, which opens the valves $r$ in the seed-tubes by reason of being connected to said valves, as before described, and causes the seeds collected by the valves to drop to the furrow. As the knot in the cord or wire passes beyond the lever the springs return the lever to its initial position and closes the valves, to be again operated by the succeeding knot, and so on. The knots being equidistant from each other in the wire, it follows that the corn will be planted in hills at regular intervals. On the return row the wire operates the lever on the opposite side of the planter.

A corn-planter attachment thus constructed is exceedingly simple, is thoroughly efficient, and causes the corn to be planted in check-rows with very little difficulty.

Having thus described my invention, I claim—

1. The combination, with the corn-planter having seed-tubes, of the valves in the tubes, the rock-shaft connected to the valves and having the bent arms, the bracket-arms secured to the planter and having the heads, the fulcrumed levers and guiding-sheaves secured to the heads, the springs bearing on the levers, and said levers being connected to the arms of the rock-shaft, and the knotted cord or wire passing through the sheaves for operating the levers and opening the valves, substantially as described.

2. The combination, with a corn-planter having seed-tubes and pivoted valves $r$ in said tubes, of the rock-shaft $m$, having arms $n$ and $o$, rods $p$, connecting arms $o$ with the valves, bracket-arms $a$, secured to the planter and having the heads $b$, guiding-sheaves on said heads, levers $h$, fulcrumed to the heads and having bifurcated fingers $i$, the lower arms of the levers being connected to the arms $n$, springs $k$, connected to the levers, and a knotted cord or wire passing through the sheaves for operating one of the levers, substantially as described.

In testimony that I claim the foregoing as my own I have hereto affixed my signature in presence of two witnesses.

LEVI J. ODELL.

Witnesses:
J. A. ODELL,
JAS. F. EARNHEART.